US007443389B1

(12) United States Patent
Alben

(10) Patent No.: US 7,443,389 B1
(45) Date of Patent: Oct. 28, 2008

(54) PIXEL CLOCK SPREAD SPECTRUM MODULATION

(75) Inventor: Jonah M. Alben, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 688 days.

(21) Appl. No.: 10/987,023

(22) Filed: Nov. 11, 2004

(51) Int. Cl.
*G06F 3/038* (2006.01)
*G09G 3/00* (2006.01)
*G09G 3/36* (2006.01)
*G09G 5/00* (2006.01)

(52) U.S. Cl. .......................... 345/204; 345/30; 345/99; 345/213

(58) Field of Classification Search ........... 345/30-100, 345/204-214; 348/441-459
See application file for complete search history.

(56) References Cited

U.S. PATENT DOCUMENTS 5,801,780 A * 9/1998 Schaumont et al. ......... 348/441
6,046,735 A * 4/2000 Bassetti et al. .............. 345/204
6,720,943 B1 * 4/2004 Kim et al. ...................... 345/87
7,050,080 B2 * 5/2006 Ema et al. .................... 347/235
7,190,360 B1 * 3/2007 Hiroki ........................ 345/213
7,359,007 B2 * 4/2008 Wu ............................ 348/581
2003/0020830 A1 * 1/2003 Sani et al. .................. 348/447

* cited by examiner

*Primary Examiner*—David L Lewis
(74) *Attorney, Agent, or Firm*—Townsend and Townsend and Crew LLP; J. Matthew Zigmant

(57) ABSTRACT

Circuits, methods, and apparatus that reduce the peak or maximum EMI generated by video signals provided to a CRT or digital display monitor. One exemplary embodiment provides for spreading the spectrum of the video signal in order to spread or diffuse its peak spectral component. This may be done by spreading the spectrum of a pixel clock that is used to clock or time pixel information provided to the monitor. One embodiment spreads the spectrum of the pixel clock by varying the frequency of its operation. The pixel clock is generated by a phase-locked loop having a number of dividers. These dividers divide the frequency of one or more of the signals around the phase-locked loop. The divide ratio is varied as a function of time, resulting in a variation of an output signal frequency as a function of time.

22 Claims, 7 Drawing Sheets

PIXEL CLOCK SPREAD SPECTRUM MODULATION

BACKGROUND

The present invention relates to reducing electromagnetic interference (EMI) generated by computer systems generally, and more particularly to reducing EMI by spreading the emission spectrum of pixel clock signals and pixel information provided to CRTs and digital displays.

Electronic equipment sold in the United States typically must meet certain regulations regarding the emission of electromagnetic interference. These and other regulations are generated by the Federal Communication Commission. They help equipment to be used in proximity with other equipment without impairing the other equipment's operation. Other regulatory bodies, such as the European Union have similar requirements. The requirements of these regulations are beyond the scope of this document.

If these emission standards are not met by an initial design of an electronic equipment product, several costs are incurred. For example, the product may be delayed, resulting in lost opportunity costs. Also, corrective action may need to be taken, such as the incorporation of more complicated and expensive components and shielding. Further testing is likely to be required to ensure compliance, with its associated costs and delays.

EMI is caused by signals being transferred around electronic systems, particularly from one electronic component in the system to another. Generally, the stronger a signal component at a particular frequency, the higher the EMI at that frequency. The peak EMI spectral component is typically of most concern and the component that needs to be reduced to achieve compliance.

One type of electronic equipment that receives much attention from an EMI point of view are monitors such as cathode-ray tube monitors (CRTs) and digital displays, such as flat panel monitors. In particular, the signals that drive these monitors, video signals, create EMI that may cause compliance difficulties.

Conventional solutions to this problem include the use of filters or chokes that reduce the edge rate of the video signal. Adding shielding may make further improvements. But these add costs and can degrade image quality.

Thus, what is needed are circuits, methods, and apparatus that provide a reduction in the maximum EMI generated by video signals without adding costly devices or shielding, and without degrading image quality noticeably.

SUMMARY

Accordingly, embodiments of the present invention provide circuits, methods, and apparatus that reduce the peak or maximum EMI generated by video signals provided to a CRT or digital display monitor. One exemplary embodiment provides for spreading the spectrum of the video signal in order to spread or diffuse its peak spectral component. In various embodiments, this is done by spreading the spectrum of a pixel clock that is used to clock or time pixel information provided to the monitor.

One exemplary embodiment spreads the spectrum of the pixel clock by varying the frequency of its operation. This particular embodiment generates its pixel clock using phase-locked loop having a number of dividers. These dividers divide the frequency of one or more of the signals around the phase-locked loop. The divide ratio is varied as a function of time, resulting in a variation of an output signal frequency as a function of time. The output signal may then be used as the pixel clock, or the pixel clock may be derived from this signal. Embodiments of the present invention may incorporate one or more of these and the various features described herein.

Another exemplary embodiment of the present invention provides an integrated circuit. This integrated circuit includes a phase-locked loop having a divider and is configured to provide a pixel clock having a variable frequency. The integrated circuit also includes an output logic circuit configured to receive the pixel clock and further configured to provide pixel information clocked by the pixel clock. The divider is configured to divide a signal by a value, and this value is variable over time.

A further exemplary embodiment of the present invention provides a method of providing a video signal. This method includes generating a clock signal having a frequency, receiving a synchronizing signal, varying the clock frequency at a rate synchronous with the synchronizing signal, and providing a plurality of pixels at the clock frequency.

Another exemplary embodiment of the present invention provides an integrated circuit. This integrated circuit includes a clock generating circuit configured to provide a clock signal having a variable frequency, an output circuit configured to receive pixel information and provide the pixel information timed to the clock signal, and a digital-to-analog converter configured to receive the pixel information timed to the clock signal and further configured to provide an analog signal to a monitor.

A better understanding of the nature and advantages of the present invention may be gained with reference to the following detailed description and the accompanying drawings.

BRIEF DESCRIPTION OF THE DRAWINGS

FIG. 4A illustrates a horizontal synchronizing and a pixel clock modulation signal for one embodiment of the present invention, while FIG. 4B illustrates a horizontal synchronizing and a pixel clock modulation signal for another embodiment of the present invention;

FIG. 5A illustrates the improvement in an electromagnetic spectrum produced by a computer display driven in accordance with one embodiment of the present invention over a computer display driven in a conventional manner, while

DESCRIPTION OF EXEMPLARY EMBODIMENTS

Figure 1:
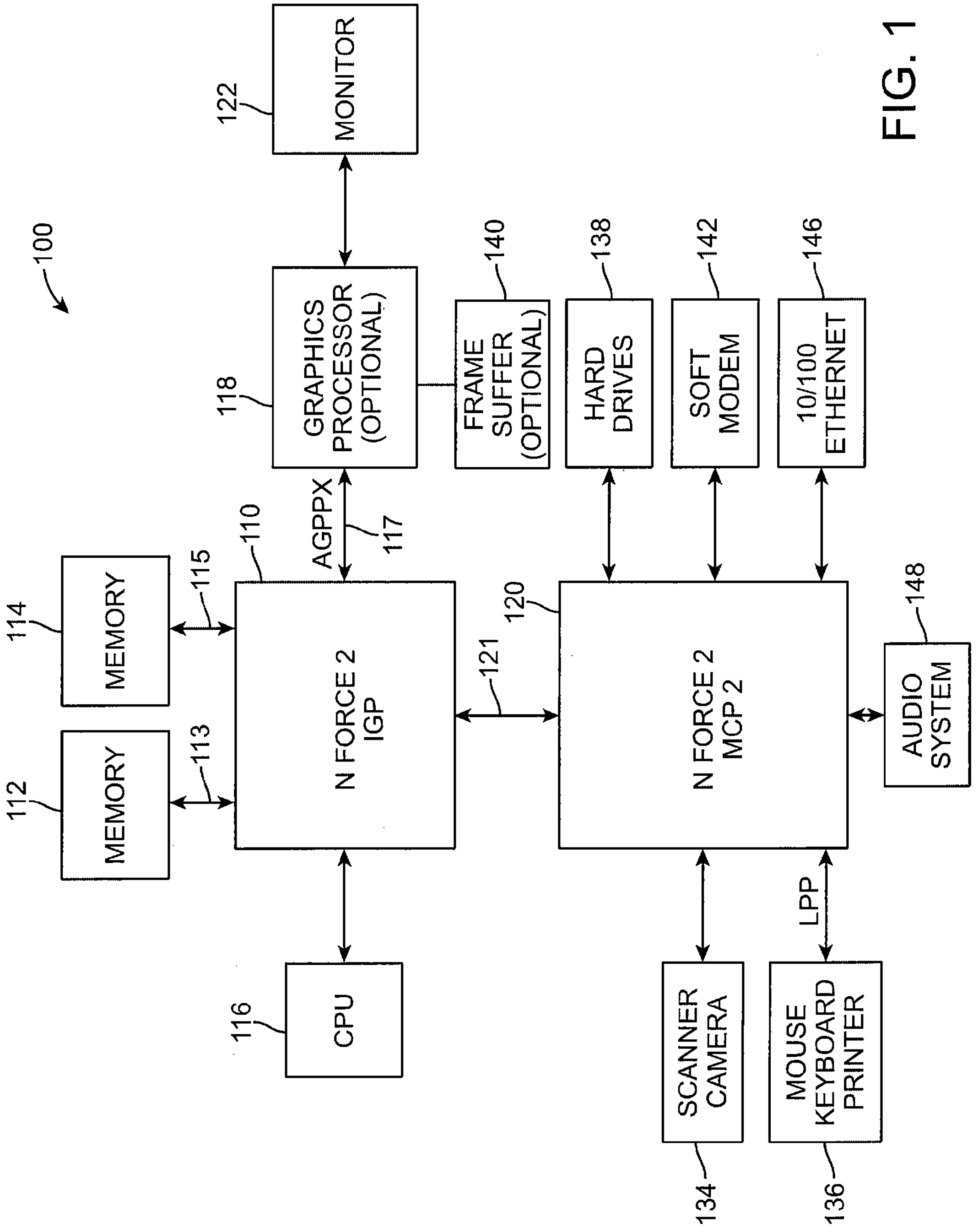
FIG. 1 is a block diagram of an improved computer system 100 that benefits by the incorporation of embodiments of the present invention.

FIG. 1 is a block diagram of an improved computer system 100 that benefits by the incorporation of embodiments of the present invention. The improved computer system 100 includes an NVIDIA nForce™2 integrated graphics processor (IGP) 110, an nForce2 media communications processor (MCP2) 120, memory 112 and 114, CPU 116, optional graphics processor 118 and frame buffer 140, monitor 122, scanner or camera 134, mouse, keyboard, and printer 136, hard drives 138, soft modem 142, Ethernet network or LAN 146, and audio system 148.

This revolutionary system architecture has been designed around a distributed processing platform, which frees up the CPU to perform tasks best suited to it. Specifically, the nForce2 IGP 110 includes a graphics processing unit (GPU) (not shown) which is able to perform graphics computations previously left to the CPU 116. Alternately, the nForce2 IGP 110 may interface to an optional GPU 118 which performs these computations. Also, nForce2 MCP2 120 includes an audio processing unit (APU), which is capable of performing many of the audio computations previously done by the CPU 116. In this way, the CPU is free to perform its tasks more efficiently. Also, by incorporating a suite of networking and communications technologies such as USB and Ethernet, the nForce2 MCP2 120 is able to perform much of the communication tasks that were previously the responsibility of the CPU 116.

In this architecture, the nForce2 IGP 110 communicates with memories 112 and 114 over buses 113 and 115. The nForce2 IGP 110 also interfaces to an optional graphics processor 118 over an advanced AGP bus 117. In various computer systems, optional processor 118 may be removed, and the monitor 122 may be driven by the nForce2 IGP 110 directly. In other systems, there may be more than one monitor 122, some or all of which are coupled to optional graphics processor 118 or the nForce2 IGP 110 directly. The nForce2 IGP 110 communicates with the nForce2 MCP2 120 over a HyperTransport™ link 121. The optional graphics processor 118 may also interface with external memory, which is not shown in this example.

The nForce2 MCP2 120 contains controllers for Ethernet connections 146 and a soft modem 142. The nForce2 MCP 120 also includes interfaces for a mouse, keyboard, and printer 136, and USB ports for cameras and scanners 134 and hard drives 138.

This arrangement allows the CPU 116, the nForce2 IGP 110, and the nForce2 MCP2 120, to perform processing independently, concurrently, and in a parallel fashion.

Embodiments of the present invention may be used to reduce the electromagnetic emission caused by signals provided by the nForce2 IGP 110 or the processor 118 to the monitor 120. Conventionally this reduction has been limited by the use of expensive filters, chokes, shielding, or combinations of these. Embodiments of the present invention reduce EMI in a way that allows lower cost filters or chokes to be used, the amount and complexity of shielding to be reduced, or a combination of these.

When the monitor 120 is a cathode-ray tube (CRT) type monitor, the nForce2 IGP 110 or processor 118 provides analog waveforms that control the amount of energy provided to three electronic guns. These electron guns produce streams of electrons that strike the monitor 120 screen illuminating its pixels. Variations in the analog waveforms as a function of time produce variations in pixel illumination, resulting in a displayed image.

When each pixel is illuminated for the same period of time, the frequency spectrums of the analog waveforms have a large component at the frequency that is the reciprocal of this period. Similarly, if the monitor 120 is a flat-panel, plasma, or other digital monitor, the in nForce2 IGP 110 or processor 118 provides a number of digital waveforms that control the illumination of each pixel. Again, if each pixel is updated at a constant rate, the frequency spectrums of these digital waveforms include large components at the frequency that is the reciprocal of this rate. In these or similar situations, these large frequency components result in electromagnetic radiation at that frequency.

Electronic equipment sold in the United States typically must meet certain federal communication commission (FCC) standards. These standards typically limit the amount of electromagnetic interference (EMI) that electronic equipment may produce. Failure to meet the standards often results in delays in bringing products to market. Additionally, there may be extra costs associated with more expensive shielding, filtering, and further testing needed to bring the device into compliance.

Again, for these reasons, it is desirable to reduce the EMI produced at any single frequency. One way to do this is to an employ spreading the spread spectrum techniques to the signals provided to the monitor 120.

Figure 2:
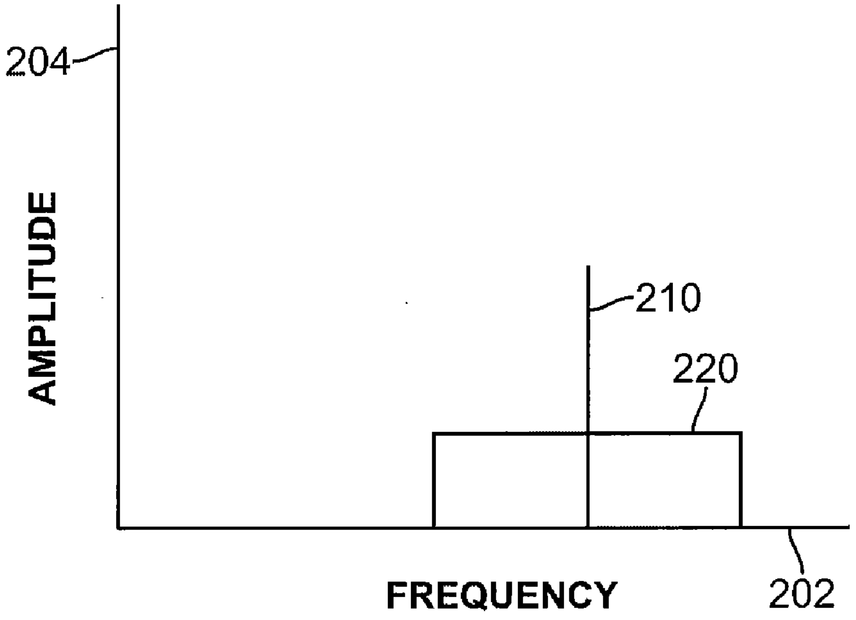
FIG. 2 illustrates a comparison between electromagnetic spectrums produced by a computer display driven in a conventional manner and a computer display driven in accordance with an embodiment of the present invention.

FIG. 2 illustrates a comparison between electromagnetic spectrums produced by a computer display driven in a conventional manner and a computer display driven in accordance with an embodiment of the present invention. This figure, as with the other included figures, is shown for illustrative purposes only, and does not limit either the possible embodiments of the present invention or the claims.

The amplitude, or signal power, of the signals are plotted on Y-axis 204 as a function of frequency along x-axis 202. The spectrums resulting from conventional signaling is greatly simplified as 210. In practical systems, there are many other frequency components present. For example, there are components at the harmonics of this frequency, and components whose location depends on the actual image being displayed. However, one of the largest components may often be at the frequency that is the reciprocal of one-half the rate at which each pixel is updated by an electron beam produced in a cathode-ray tube or by a digital signal in a flat-panel display, or by these and or other types of signaling on these or other types of monitors. (The one-half term comes about because two pixels are needed for one "cycle" of intensity change.)

In general, the more the variation in intensity between pixels, the higher the amplitude of the resulting emission frequency components.

Spectrum 220 illustrates the resulting spectrum if the update time for each pixel is varied. As might be expected, the more the frequency is varied, the more the amplitude of 220 is reduced and the more its width is increased. In this way, by spreading the electromagnetic power, the worst-case amplitude is reduced, and therefore the worst-case electromagnetic interference is reduced.

Typically, the signals provided by an nForce2 IGP 110 or processor 118 to the monitor 120 are clocked or timed by a clock signal referred to as a pixel clock. Accordingly, embodiments of the present invention provide circuits, methods, and systems for spreading the spectrum of the pixel clock and thus the resulting electromagnetic interference pattern. By spreading the spectrum of the pixel clock, the update time for each pixel is varied.

Figure 3:
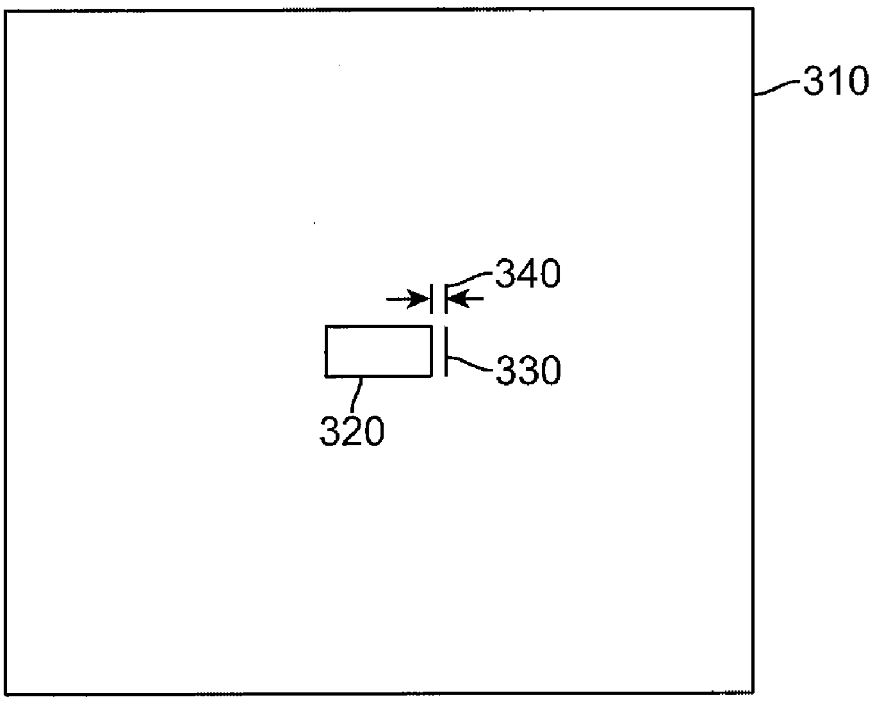
FIG. 3 illustrates a problem that occurs when a pixel clock frequency is changed over time.

FIG. 3 illustrates a problem that occurs as a pixel clock frequency is changed in order to vary the update time for each pixel. This figure includes a monitor screen 310 and a single pixel 320 for illustrative purposes.

In a typical monitor, the screen 310 includes a number of horizontal lines (not shown). The pixels on each line are updated sequentially, and when one horizontal line is complete, the next one is begun. After each line on the screen has been updated, the entire process begins again. The time it takes to update one line is the horizontal line rate, while the time to complete the screen is referred to as the first refresh rate.

Accordingly, each pixel 320 is updated or refreshed for an amount of time that may vary over time. For example, during one screen refresh, the pixel may be updated for an amount of time corresponding to pixel size 320. During the next screen refresh, the pixel may be updated for an amount of time shown as dashed line 330, which is an amount of time 340 longer than its update time during the previous screen refresh. If this variation of pixel width occurs on a CRT, the image appears to swim.

One solution used by embodiments of the present invention is to synchronize the variation in the pixel clock or pixel update period to the horizontal line rate. In that way, each individual pixel does not change width from one screen refresh to another, rather different pixels along each horizontal line have slight variations in their width. In one embodiment, the pixel width variation is the same for each horizontal line retrace. In this case, one column of pixels has a different width from other columns of pixels. In other embodiments, pixel widths vary in a different manner each horizontal retrace. It should be noted that even a slight variation in pixel width leads to the very good EMI reduction without creating visible artifacts.

The horizontal retrace of a typical monitor is controlled by a horizontal synchronizing signal, a referred to as HSYNC. Accordingly, various embodiments of the present invention synchronize the modulation or variation in frequency of the pixel clock and resulting image data to the horizontal synchronizing signal. In other embodiments of the present invention, this modulation may be synchronized to other signals, such as the in vertical synchronizing signal, typically referred to as VSYNC.

Figures 4A, 4B:
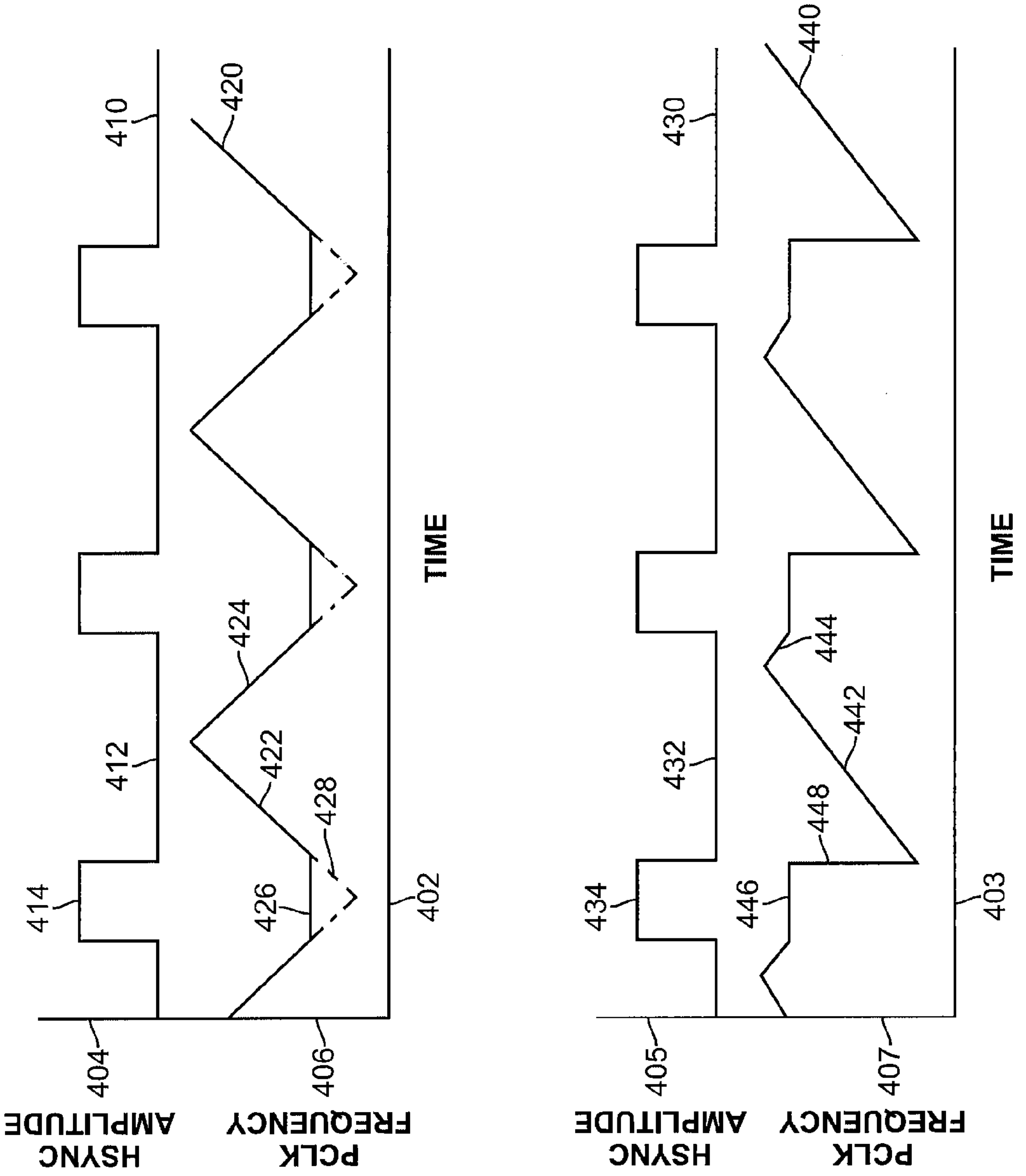

FIG. 4A illustrates a horizontal synchronizing and a pixel clock modulation signal for one embodiment of the present invention. A horizontal synchronizing signal is plotted along a Y-axis of amplitude 404 as a function of time on X-axis 402. HSYNC 410 includes an active time period 412 during which each of the pixels on an individual horizontal line are updated, and an inactive period 414, which may be referred to as a blanking period during which a horizontal retrace occurs and no pixels are updated.

The frequency of the pixel clock, or really the pixel clock modulation signal, is plotted on Y-axis 406 in frequency as a function of time on X-axis 402. During the blanking time 414, the pixel clock may either be varied, as indicated by lines 428, left constant as indicated by lines 426, or allowed to drift or go to some other value. During the horizontal retrace time 412, the pixel clock frequency may be varied as indicated by line segments 422 and 424. In this particular embodiment, the pixel clock frequency first increases then decreases, each for one-half of the horizontal retrace time, and each at a constant rate. In other embodiments of the present invention, the pixel clock frequency may increase or decrease a different number of times, at different or varying rates, and the pixel clock frequency may be increased or decreased in different orders.

As can be seen, in this particular embodiment, both the beginning and end of each pixel clock modulation cycle is synchronized to the beginning and end of the HSYNC active period 412. This ensures that the pixel clock is at each of the frequencies in its range for the same amount of time. It will be appreciated by one skilled in the art that there are many other waveforms that are synchronized to the beginning and end of an HSYNC active period and that may be used as the pixel clock modulation signal. Also, different waveforms may be used during different horizontal retrace periods, though the same waveform should generally be used from one screen refresh to another to avoid having the image "swim," though an exception may be made if the contents of the image is updated or changed significantly.

FIG. 4B illustrates a horizontal synchronizing and a pixel clock modulation signal for another embodiment of the present invention. Again, a horizontal synchronizing signal 430 is plotted along a Y-axis 405 as a function of time on X-axis 403. Also, the pixel clock frequency is plotted along Y-axis 407 as a function of time along X-axis 403.

In this particular embodiment, during the active period 432, the pixel clock frequency increases as is indicated by line segments 442. At some point, the pixel clock frequency begins to decrease until the end of the active period 432.

As can be seen, in this embodiment, the end of the pixel clock modulation signal 440 is not synchronized to the HSYNC signal 430. This means that the pixel clock is at some frequencies for a longer period of time than it is at other frequencies. The spectral ramifications of this are shown below. It will be appreciated by one skilled in the art that there are many waveforms that may be used as the pixel clock modulation signal 440, some of which may be synchronized to an HSYNC start time, others that are synchronized to other portions of an HSYNC or HSYNC related signal. Further, a different waveform may be used for different horizontal retraces, though the same waveform should be used for the same line from one screen refresh to another to avoid having the image "swim" as described above.

Figure 5A:
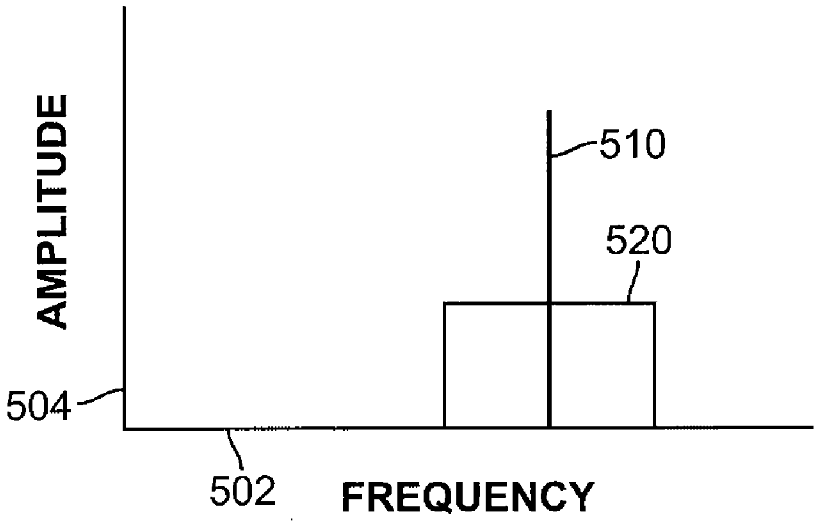

FIG. 5A illustrates the improvement in an electromagnetic spectrum produced by a computer display driven in accordance with an embodiment of the present invention, such as the embodiment of FIG. 4A, over a computer display driven in a conventional manner. The spectrum amplitudes are plotted on Y-axis 504 as a function of frequency along the X-axis 502.

As before, in conventional systems the pixel clock does not change, resulting an EMI spectrum that may be simplified as 510. Embodiments of the present invention, such as the embodiment illustrated FIG. 4A, spread the pixel clock evenly over a frequency range resulting in the spectrum 520.

Again, these spectrum are highly simplified for illustrative purposes. Practical spectrums contain harmonics, sidebands, and other frequency artifacts.

Figure 5B:
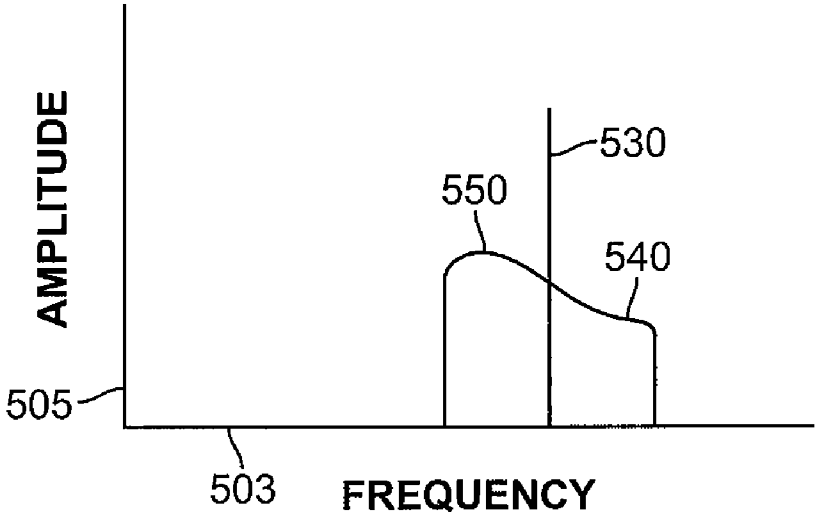
FIG. 5B illustrates the improvement in an electromagnetic spectrum produced by a computer display driven in accordance with another embodiment of the present invention over a computer display driven in a conventional manner.

FIG. 5B illustrates the improvement in an electromagnetic spectrum produced by a computer display driven in accordance with another embodiment of the present invention, such as the embodiment of FIG. 4B, over a computer display driven in a conventional manner. Again, the spectrum amplitudes are plotted along a Y-axis 505 as a function of frequency along an X-axis 503. Again, a conventional system produces the spectrum 530, whereas embodiments of the present invention such as the one illustrated in FIG. 4B results in the spectrum 540.

Again, the embodiment illustrated in FIG. 4B provides a pixel clock frequency that is present at one frequency longer than another frequency. Accordingly, the spectrum 540 has a high point 550, which corresponds to the pixel clock frequency having a higher occurrence. In most systems, this should not compromise EMI significantly, and may make the design of the supporting circuitry simpler. One such supporting circuit is shown as the next-figure.

Figure 6:
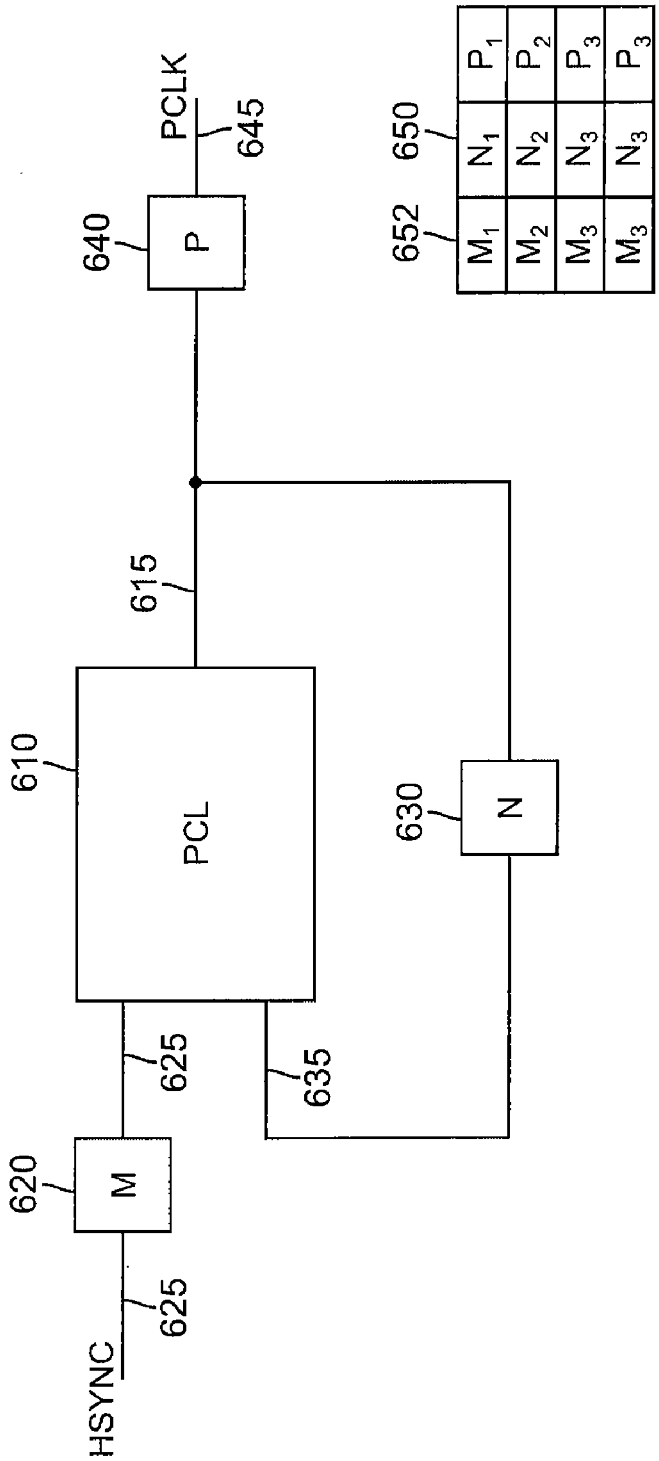
FIG. 6 illustrates a phase-locked loop and associated look-up table according to an embodiment of the present invention.

FIG. 6 illustrates a phase-locked loop and associated look-up table according to an embodiment of the present invention. This circuit includes a phase-locked loop 610, and dividers 620, 630, and 640.

A horizontal synchronizing signal is received on line 625 by the dividers 620. The divider 620 divides the frequency of the HSYNC signal by a factor of M and provides an output on line 625 to the phase-locked loop 610. The phase-locked loop 610 provides a clock signal on line 615, which is divided by a divider 640 and provided as the pixel clock on line 645. The output of the phase-locked loop on line 615 is also divided by divider 630, which provides a divided phase-locked loop output on line 635 to the input of phase-locked loop 610. The phase-locked loop 610 compares the phase and frequencies of the signals on line 625 and 635, and provides the proper clock output on line 615.

In this specific embodiment, the frequency of the HSYNC signal is divided by divider 620 by a factor of M. Also, the signal provided by the PLL 610 on line 615 is divided by the divider 640 by a factor of P and by the divider 630 by a factor of N.

Accordingly, there are N/MP PCLKs for each HSYNC cycle on line 625. Thus, the frequency of the clock period may be varied by changing M, N, or P. A specific embodiment of the present invention utilizes a lookup table 615 having a number of entries 652 for M, N, and P. These table entries may be utilized for one or a number of clock periods. Each entry in the table may be varied, resulting in clock modulation signals such as those shown in FIGS. 4A and 4B.

This table may be located in memory on the same integrated circuit as the phase-locked loop, or in a frame buffer or system memory. The table may alternately be formed of registers or other storage devices. In another embodiment of the present invention, table 615 may be replaced by other tables and other entries, or by other signals, such as time varying signals.

The pixel clock can then be used to clock or time pixel information, that is, the video signal. Typically this is done by an output circuit, such as a scanout engine or other logic circuit. A scanout engine retrieves pixel information from a memory, such as the frame buffer or graphics memory 140 or system memory 112 in FIG. 1, and retimes it to the pixel clock. The resulting output signal is then provided to a monitor, often after conversion to analog signals by digital-to-analog converters. In other embodiments, the pixel clock is provided along with pixel information to a monitor. In either case, the video information spectrum is spread, and the resulting maximum EMI is reduced.

In this particular embodiment, a digital PLL and lookup table is used. In other embodiments, analog circuitry may be used, and an analog signal may be varied. For example, a bias voltage for a varactor diode or other capacitance, or a voltage controlled oscillator control voltage may be modulated, thus varying the pixel clock output. Further, if a digital PLL is used, other circuitry, such as a counter, may be used in place of a lookup table.

Figure 7:
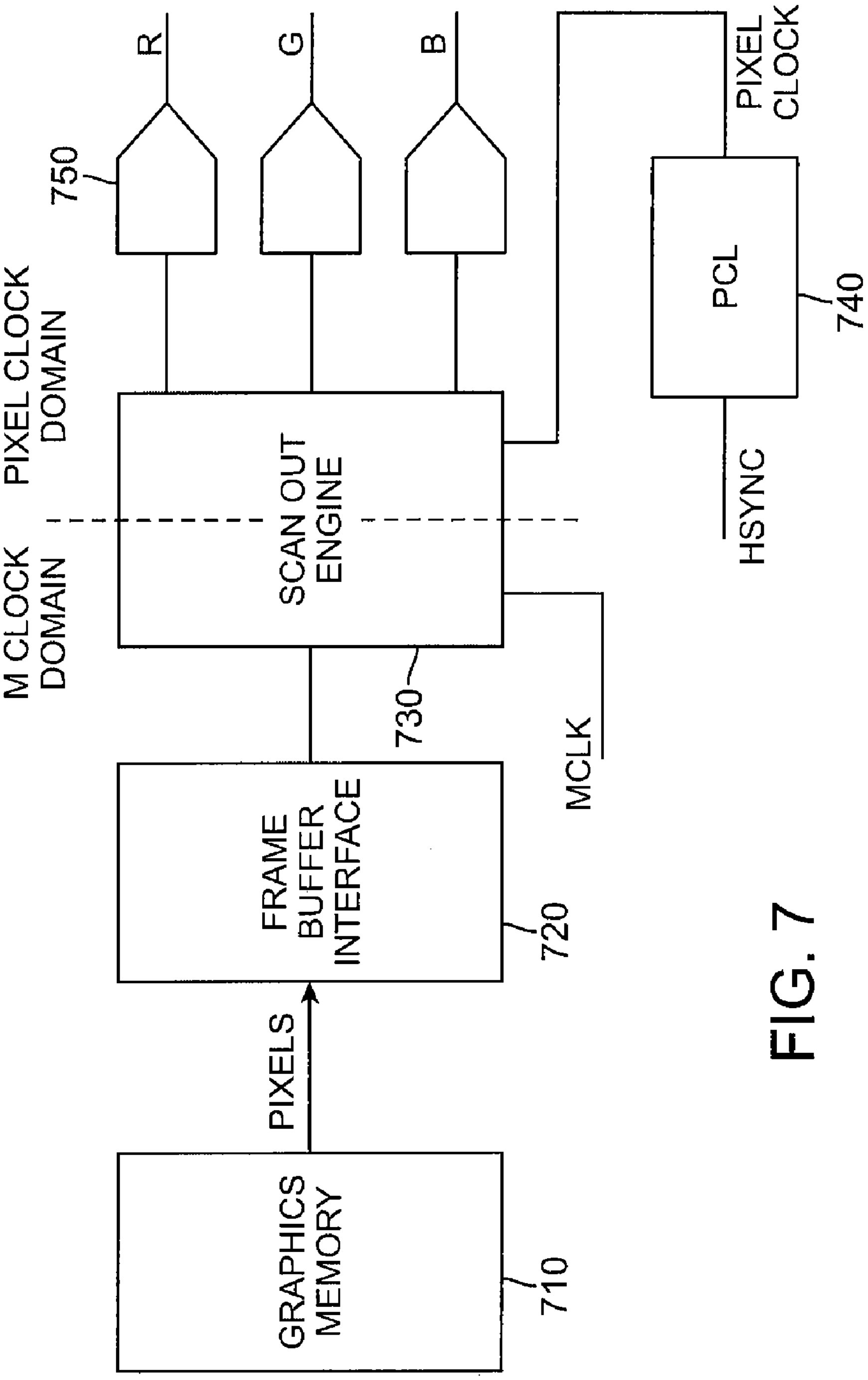
FIG. 7 is a block diagram of a portion of a graphics processor pipeline that provides pixel information that has been retimed to a variable pixel clock.

FIG. 7 is a block diagram of a portion of a graphics processor pipeline that provides pixel information that has been retimed to a variable pixel clock. This circuitry includes a frame buffer or graphics memory 710, frame buffer interface 720, scanout engine 730, phase-locked loop 740, and digital to analog converters 750. Pixels are read out of the frame buffer 710 via the frame buffer interface at a memory clock rate. The phase-locked loop 740 may be the phase-locked loop of FIG. 6 or other phase-locked loop consistent with embodiments of the present invention.

The scanout engine 730 receives the pixel clock from the phase-locked loop 740 and retimes the pixels to the pixel clock signal. The pixels are converted to red, green, and blue analog signals by the digital-to-analog converters 750 and provided to a monitor (not shown). It will be appreciated by one skilled in the art that other output circuits, for example circuits configured to drive digital displays, may be made consistent with embodiments of the present invention.

The above description of exemplary embodiments of the invention has been presented for the purposes of illustration and description. It is not intended to be exhaustive or to limit fhe invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. An integrated circuit comprising:

a phase-locked loop having a divider and configured to provide a pixel clock having a variable frequency; and an output logic circuit configured to receive the pixel clock and further configured to provide pixel information clocked by the pixel clock, wherein the divider is configured to divide a frequency of a signal by a value, and wherein the value is variable over time, and wherein the value is determined by entries in a look-up table.

2. The integrated circuit of claim 1 wherein the entries in the look-up table are retrieved synchronously with a first signal.

3. The integrated circuit of claim 2 wherein the first signal is a horizontal synchronizing signal.

4. The integrated circuit of claim 3 wherein the pixel information is converted to an analog signal by a digital-to-analog converter after being retimed to the pixel clock.

5. The integrated circuit of claim 4 wherein the pixel informal ion is retrieved from a memory before being retimed to the pixel clock.

6. The integrated circuit of claim 1 wherein the pixel clock frequency is varied from a first frequency to a second frequency at a linear rate.

7. The integrated circuit of claim 1 wherein the pixel clock frequency is varied from a first frequency to a second frequency at a non-linear rate.

8. A method of providing a video signal, the method comprising:

generating a clock signal having a frequency;

receiving a synchronizing signal;

varying the clock frequency according to a waveform that is synchronous with a first edge of the synchronizing signal and not synchronous with a second edge of the synchronizing signal such that the clock frequency at the first edge of the synchronizing signal is different from the clock frequency at the second edge of the synchronizing signal; and providing a plurality of pixels at the clock frequency.

9. The method of claim 8 wherein the synchronizing signal is a horizontal synchronizing signal.

10. The method of claim 9 wherein the clock frequency is varied by varying an analog voltage.

11. The method of claim 9 wherein the clock signal is generated by a phase-locked loop including a divider.

12. The method of claim 11 wherein the divider divides the frequency of an input signal by a value, and the value varies as a function of time.

13. The method of claim 12 wherein the value is determined by entries in a look-up table.

14. An integrated circuit comprising:

a clock generating circuit configured to provide a clock signal having a variable frequency, wherein the variable frequency varies in a pattern that repeats each cycle of a first signal, such that the variable frequency has a first value at a first edge of the first signal, a second value at a second edge of the first signal, and a third value at a time between the first edge of the first signal and the second edge of the first signal, the third value different than the first value, and the second value between the first value and the third value;

an output circuit configured to receive pixel information and provide the pixel information timed to the clock signal; and a digital-to-analog converter configured to receive the pixel information timed to the clock signal and further configured to provide an analog signal to a monitor.

15. The integrated circuit of claim 14 wherein clock generating circuit is a phase-locked loop having a divider, the divider configured to divide a signal by a value, wherein the value varies as a function of time.

16. The integrated circuit of claim 15 wherein the value is determined by entries in a look-up table.

17. The integrated circuit of claim 14 wherein the first signal is a horizontal synchronizing signal.

18. The integrated circuit of claim 17 wherein the clock signal frequency is varied from the first value to the third value at a linear rate.

19. The integrated circuit of claim 17 wherein the clock signal frequency is varied from a the first value to the third value at a non-linear rate.

20. The integrated circuit of claim 2 wherein the variable frequency varies in a pattern that repeats each cycle of the first signal; such that the variable frequency has a first value at a first edge of the first signal, a second value at a second edge of the first signal, and a third value at a time between the first edge of the first signal and the second edge of the first signal, the third value different than the first value, and the second value between the first value and the third value.

21. The integrated circuit of claim 20 wherein a resulting EMI spectrum for the pixel clock has a higher level in a frequency range between the third value and the second value than in a frequency range between the first value and the second value.

22. The integrated circuit of claim 14 wherein a resulting EMI spectrum for the clock signal has a higher level in a frequency range between the third value and the second value than in a frequency range between the first value and the second value.

* * * * *